United States Patent Office 3,005,898
Patented Oct. 24, 1961

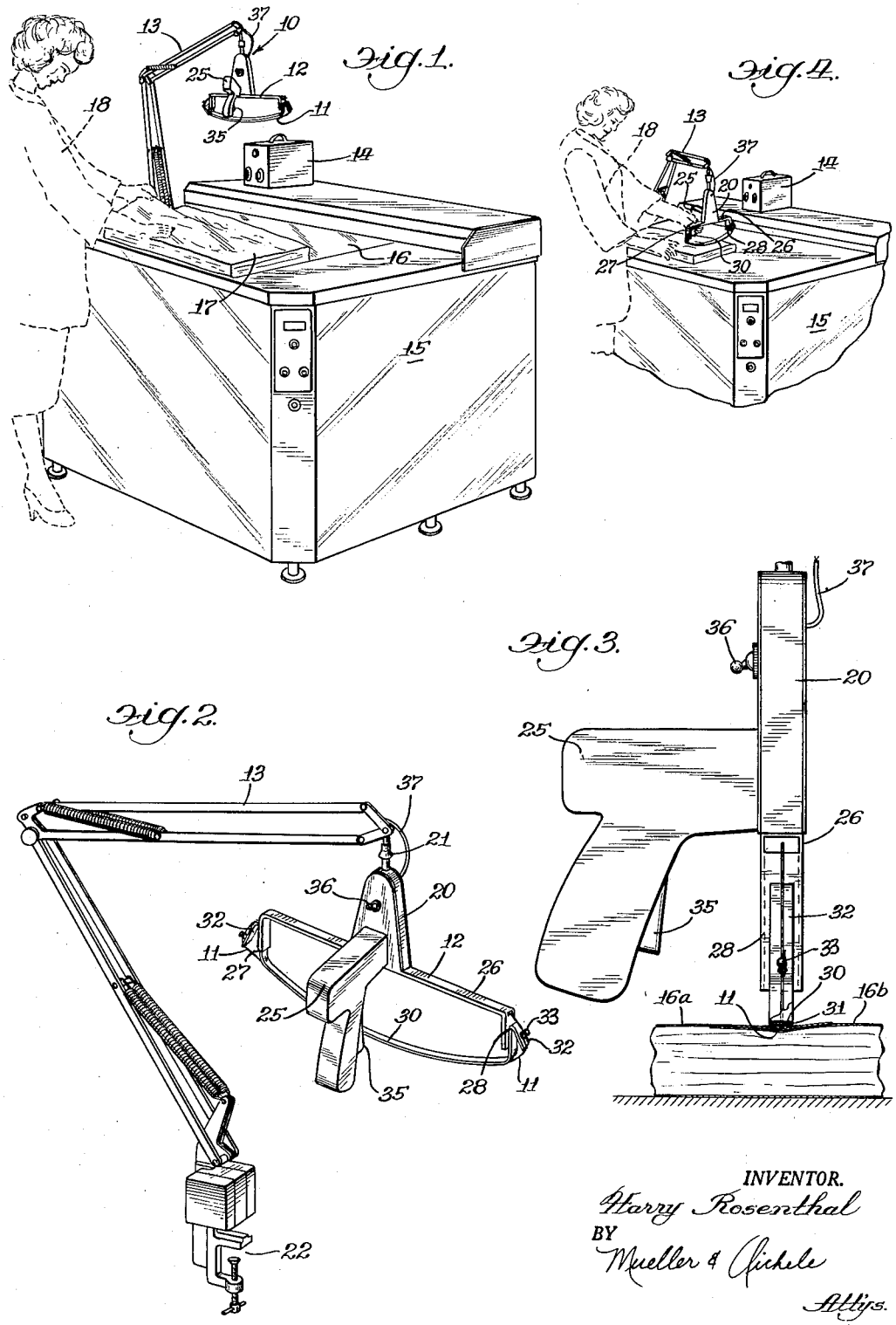

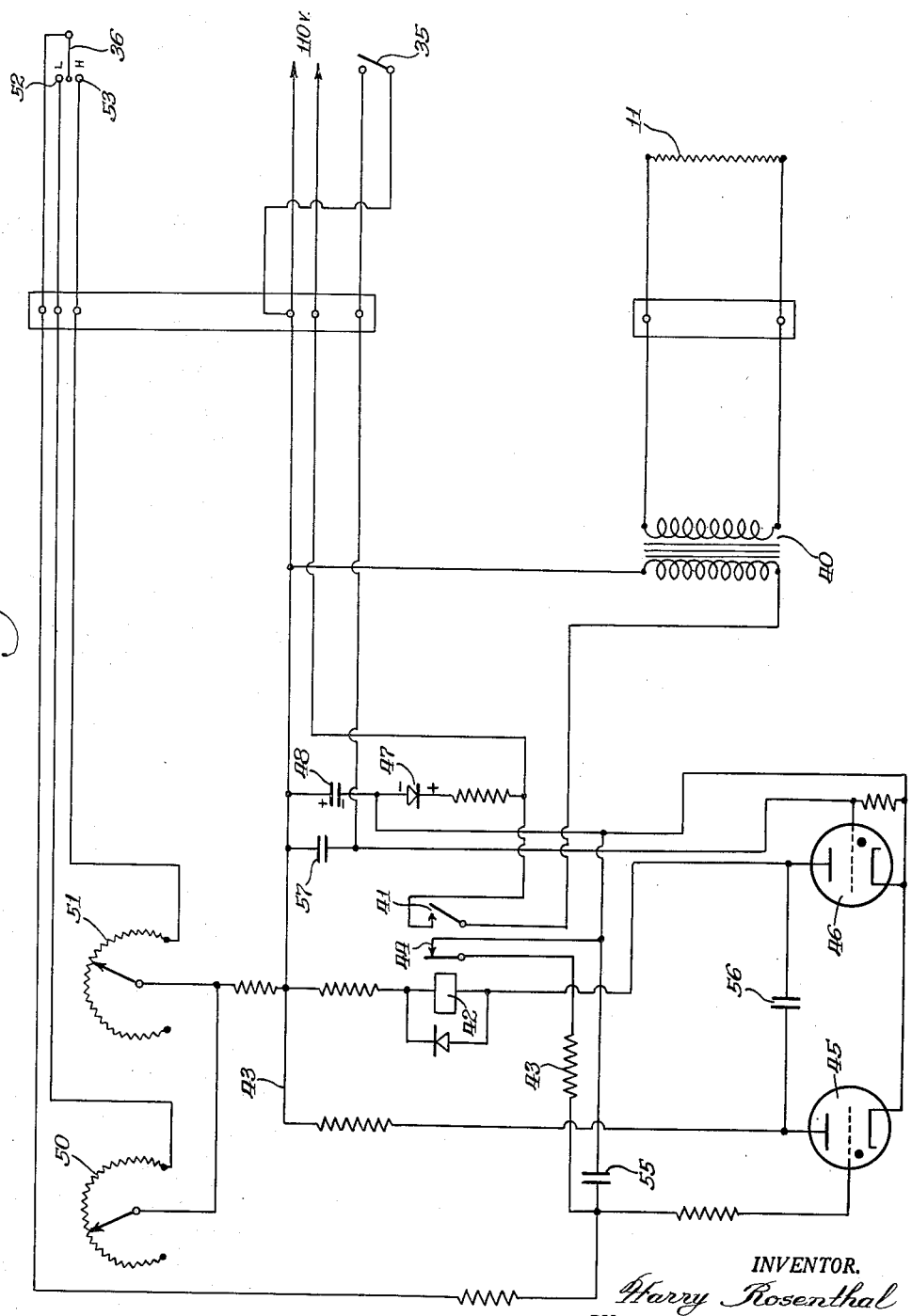

3,005,898
HEAT SEALING APPARATUS
Harry Rosenthal, 6540 N. Campbell Ave., Chicago, Ill.
Filed Oct. 24, 1960, Ser. No. 64,624
9 Claims. (Cl. 219—21)

This invention relates generally to heat sealing devices and more particularly to a device for sealing wrappings of polyethylene and other fusible materials.

The use of polyethylene and other transparent films for wrapping packages has become increasingly popular. This is because it is possible to provide a neat package wherein the material wrapped in the package is visible from the outside. This is advantageous both as it is possible to inspect attractive items without directly touching the same, and because items in packages can be identified so that mistakes resulting from picking up the wrong package will be minimized.

A problem has presented itself in the securing of such wrappings, however, inasmuch as tape or cord used with paper wrappings are not entirely satisfactory. The transparent films generally used are fusible and therefore layers of the film may be welded together by application of heat. However, such heat must be applied at desired locations and must be carefully controlled to fuse the layers without producing an opening therein. This presents a particular problem when a wrapping is applied in the normal manner with the two edges of the wrapping material first joined and then the ends of the package sealed down as more heat is required for the larger number of layers at the ends than for the two layers.

It is therefore an object of the present invention to provide a heat sealing device for joining plastic wrapping material which may be easily positioned with respect to an object being wrapped.

Another object of the invention is to provide a heating device for sealing a fusible film wherein the heat produced is accurately controlled.

A feature of the invention is the provision of a heat sealing device supported on a universal mounting and having an elongated heating element supported on a frame which has a handle for positioning the heating element with respect to an object being wrapped.

Another feature of the invention is the provision of a heat sealing device having an elongated heating element and a circuit for applying current thereto for providing a pulse of current in the element in response to operation of a switch on the device. The duration of the current may be controlled to provide the required amount of heat when sealing different numbers of layers of plastic material.

A further feature of the invention is the provision of a heat sealing device for joining layers of plastic wrapping material including a frame which supports a bowed member at the ends thereof, and with a heating element extending along the outer side of the bowed member so that the extent of engagement of the heating element with the wrapping may be controlled by the pressure of the bowed element against the wrapping.

The invention is illustrated in the drawings wherein;

FIG. 1 is a perspective view showing the heat sealing device of the invention supported on a wrapping table;

FIG. 2 shows the construction of the heat sealing device and mounting therefor;

FIG. 3 is an enlarged view showing the engagement of the heating element of the unit with the wrapping of a package;

FIG. 4 illustrates the operation of the heat sealing unit; and

FIG. 5 is a circuit diagram of the energizing and control circuit for the sealing device.

In practicing the invention there is provided a heat sealing device with an elongated heating element supported on a frame having a handle for positioning the element. A bowed flexible elongated strip is supported at its ends on the frame, with the strip being covered by an insulating material. A flat conducting heating element is stretched along the strip on the outwardly bowed side so that it may be pressed into engagement with the plastic wrapping material on an object. The handle may have a pistol grip configuration with a trigger forming a switch for applying energizing current to the heating element. The energizing current is applied by a timer which controls the duration of the current pulse applied to the heating element each time the trigger is operated. A second switch on the frame may be used to select one of a plurality of timed settings for the duration of the current pulse. The duration of the current at each setting is controlled by a control knob on the timer which is positioned remote from the heat sealing device. The operator may therefore remotely select one setting to provide the heat required for sealing two layers of wrapping material or a different setting to provide the heat required for sealing a greater number of layers. The frame may be mounted on a universal mounting support so that when positioned by the handle it will remain in a position selected.

Referring now to the drawings, in FIG. 1 there is illustrated the sealing device 10 including the heating element 11 provided on a frame 12 supported on a universal mounting 13. The device and mounting therefor may in turn be supported on a wrapping table 15 which may automatically feed and cut the transparent film. The film is indicated in FIG. 1 at 16, with an item such as folded sheets 17 resting thereon to be wrapped therein by an operator 18. A timer 14 for controlling the energizing current supplied to the heating element 11 may also be supported on the wrapping table as shown.

As shown more particularly in FIGS. 2 and 3, the frame 12 includes a handle 25 which may be of the pistol grip type. The body portion 20 of the frame may be connected to the universal mounting structure 13. The connection is illustrated as a swivel joint but other types of connections such as a flexible link may be used. The universal mounting structure may include a clamp 22 for securing the same to the top of a table or the like. The universal mounting structure may be of the type used for supporting desk lamps or the like, which will support the device thereon in various vertical positions and in various lateral positions.

The heating element 11 may be made of flat heater wire of a material such as Nichrome. The use of a flat wire produces a seam having some width to thereby provide substantial strength, and causes fast transfer of heat from the wire to the plastic wrapping material. A wire having a width of .0625 inch and a thickness of .0063 inch and having a resistance of 1.387 ohms per foot has been found to be satisfactory. The wire may be coated by a plastic material such as Teflon to prevent the plastic wrapping material from sticking to the heater element.

A rigid transverse frame member 26 is secured to the body member 20 and has turned down ends which support the ends 27 and 28 of a flexible elongated member having a center bowed portion 30. As shown in FIG. 3, the portion 30 has a layer or coating 31 thereabout which is of insulating material. The coating may be provided by Teflon impregnated glass tape having a thermosetting adhesive. The heating element 11 is stretched along the lower or outwardly bowed surface of the center portion 30. The ends 27 and 28 of the flexible member are shaped to form tensioning brackets 32 to which the heating element 11 is secured. The brackets 32 may be integral with the center portion 30, and the entire structure may be made of resilient metal which permits flexing of the contour of the wire and which also tensions the same. The ends of the heating element 11 may have loops positioned over terminals 33 connected to the energizing circuit by conductors provided within the transverse member 26, which may be of tubular configuration.

The heating element 11 is connected in an energizing circuit illustrated in FIG. 5 and to be explained later. A pulse of energizing current is applied thereto in response to actuation of a switch controlled by the trigger 35 in the handle 25. The operator therefore can grip the handle and operate the switch in a very simple operation. A toggle switch 36 is provided on the body portion 20 of the device to select one of a plurality of current pulse durations as will also be described. The body portion 20 is connected to the timer 14 by cable 37 which includes conductors for supplying energizing current to the heating element 30, and also control conductors for connecting the switches 35 and 36 to the timer 14.

FIGS. 3 and 4 illustrate the manner in which the heat sealing device is used in sealing a package. As shown in FIG. 3, the heating element 11 may be placed in contact with the wrapping layer 16a which engages the layer 16b. The element 11 will be held against the layers to exert some pressure thereon, which may deform the layers in the event that the item being wrapped has resilience, as illustrated in FIG. 3. This insures a good engagement between the layers to be sealed. The bowed resilient support 30 will also flex to control the extent of contact between the heating element 11 and the layers to be sealed. When the heating element is in such engaging position, the trigger 35 may be operated to apply a pulse of current to the heating element 11, which produces heat to seal the layer 16a against the layer 16b. This results because of the fusible properties of the wrapping material which may for example be polyethylene. As the heating element 11 is flat and engages the wrapping material across its width, a seal having substantial area is provided and this makes the seal quite strong.

In the illustration of FIG. 3 only two layers of film are shown in engagement and this is of course the usual condition when the first pair of edges of the wrapping are brought into engagement. As the object is completely wrapped, the ends transverse to the first seal will be brought back over the package and in such cases it is necessary that several layers be sealed together. FIG. 4 illustrates the sealing of an end in which the device is pivoted to be positioned at a 90° angle with respect to the position for the first seal. The switch 36 may be operated to a position providing a current pulse of longer duration so that a greater amount of heat will be provided which will be sufficient to seal several layers to thereby seal the ends of the package.

Referring now to FIG. 5, this illustrates the circuit for energizing and controlling the heat sealing device. Along the right hand side of the circuit is shown the heating element 11, the actuating switch 35, and the selector switch 36. These are all on the sealing device proper as previously explained. Conductors for connecting the system to 110 volt alternating current source is also shown. The heating element 11 is energized through transformer 40 which is connected to the 110 volt source through the relay contacts 41. The transformer reduces the voltage so that the voltage applied to the element 11 is at a safe potential. This is important inasmuch as the operator might come in contact with the wire. A voltage of 24 volts may be used. The contacts 41 are a part of the timer as will be further explained.

The timer includes tubes 45 and 46 to which energizing potential is applied by rectifier 47 and capacitor 48 connected to the 110 volt source. The potential on conductor 43 which is applied to the anodes of tubes 45 and 46 is positive with respect to the potential on conductor 44 which is connected to the cathodes of the tubes. When the switch 35 is operated, a circuit is established to initiate the timing cycle. The time duration is controlled by the resistors 50 and 51 which are selectively connected in the circuit. The resistor 50 is connected in the circuit when the switch 36 engages contacts 52. The resistor 51 is similarly connected in the circuit when the selector switch 36 engages the contact 53. As previously stated, the switch 36 may be a toggle switch and this may be movable to positions for engagement with the contacts 52 and 53.

Resistors 50 and 51 are variable, and the value of resistor 50 may be set to provide a timed period of one duration and the value of resistor 51 may be set to provide a timed period of a different duration. As stated above, these timed periods are then selected by selecting the positions of the toggle switch 36. When the switch 35 is operated, the relay 42 is energized to close contacts 41 which apply potential to transformer 40 which in turn energizes the heating element 11. The relay 42 remains energized for a duration controlled by the timing circuit including resistor 50 or 51, whichever has been selected.

Considering the operation of the timing circuit, tube 45 is normally conducting and tube 46 is non-conducting. When the switch 35 is open, the tube 46 is cut off by the charge on capacitor 57 which is connected to the grid thereof. When switch 35 is closed, capacitor 57 is shorted out and the grid becomes more positive to cause the tube 46 to conduct. When the tube 46 conducts, current flows through relay coil 42 and closes contacts 41 to energize transformer 40 and the heating element 11. The voltage at the plate of tube 46 will drop when the tube conducts. This voltage is applied through capacitor 56 to the plate of tube 45, and this cuts off the tube 45. In the normal condition before relay 42 is operated, the timing capacitor 55 has zero potential thereacross, being discharged through resistor 43 and normally closed contacts 44 of relay 42. When contacts 44 open, the timing capacitor 55 will charge to the voltage across capacitor 48 through the circuit including potentiometer 50 or potentiometer 51, whichever is connected in the circuit by switch 36. This will cause the grid of tube 45 to become positive so that tube 45 will again conduct. When tube 45 conducts, its plate potential is reduced and this acts through capacitor 56 to reduce the potential on the plate of tube 46. At the same time capacitor 57 in the grid circuit of tube 46 has charged to reduce the potential on the grid of this tube. This causes tube 46 to be cut off and releases relay 42. The time during which relay 42 is operated is therefore controlled by the time required for capacitor 55 to charge through potentiometer 50 or 51, whichever is selected by the switch 36.

Although the device is illustrated as supported on a universal mounting, it may be provided without such a mounting and arranged to be supported on a switch bracket or stand when not in use.

It is therefore seen that a heat sealing device has been described which is highly effective to seal plastic wrapping material or films. The sealing device produces heat along an element to fuse or weld together layers of the material to join the same. This is particularly effective for sealing transparent plastic material, such as polyethylene, which are now used for wrapping many objects. The device can be very easily adjusted so that the heat produced is of the right duration for sealing a small number of layers or larger number of layers as may be required in wrapping a single package. The use of a flat heating element with a plastic coating has been effective to provide a strong seal without causing sticking of the plastic.

I claim:

1. A device for sealing fusible material including in combination, a frame having a handle for positioning the same, an elongated flexible member supported by said frame and having a central portion spaced outwardly from said frame and inturned ends engaging said frame, an insulating layer on the outer side of said member, an elongated conducting element extending along said insulating layer, a coating of plastic material on said conducting element, and energizing means connected to said conducting element for supplying current pulses, said energizing means including switch means positioned on said handle and operative to apply a pulse of current to said element and to select the duration of said current pulse.

2. A device for sealing fusible material including in combination, a frame having a handle for positioning the same, an elongated flexible member supported adjacent its ends by said frame and having an insulating layer thereon, said elongated member having end portions engaging said frame and an intermediate portion extending outwardly from said frame, an elongated conducting element extending along said insulating layer, and means for supplying current to said conducting element including a switch positioned on said handle and operative to apply a pulse of current to said element.

3. A device for sealing fusible material including in combination, an elongated conducting element for producing heat when energized, an elongated flexible supporting member for said element, means for stretching said conducting element along said supporting member, means secured to said supporting member for positioning said supporting member in a plurality of positions, and means for supplying current to said conducting element including switch means operative to apply a pulse of current to said element.

4. A device for sealing fusible material including in combination, a frame having a handle for positioning the same, an elongated flexible member supported adjacent its ends by said frame and having an intermediate portion extending outwardly from said frame, an insulating layer on the outward side of said member, a flat electrical heating element extending along said insulating layer, and means for supplying current to said conducting element including a timing unit, a first switch positioned on said handle and operative to actuate said timing unit to thereby apply current to said element, and a second switch on said frame for controlling said timing unit to select one of a plurality of time intervals during which current is applied to said element.

5. A device for sealing fusible material including in combination, a frame having a handle for positioning the same, an elongated flexible member having a center portion and angular end portions, said end portions being supported on said frame with said center portion extending outwardly from said frame, an insulating layer on the outward side of said center portion, an elongated electrical heating element supported at said end portions of said flexible member and extending along said insulating layer, means for supplying current to said conducting element including timer means, a first switch positioned on said handle and connected to said timer means and operative to actuate said timer means to thereby apply current to said element, and a second switch on said frame connected to said timer means for controlling said timer means to select one of a plurality of timed intervals during which current is applied to said element.

6. A device for sealing fusible material including in combination, a frame having a handle for positioning the same, an elongated flexible member having a center portion and angular end portions, said end portions being supported on said frame with said center portion extending outwardly from said frame, an insulating layer on the outward side of said center portion, an elongated electrical heating element supported at said end portions and extending along said insulating layer, said end portions of said flexible member being shaped to hold said heating element stretched therebetween, means for supplying current to said conducting element, and a switch positioned on said handle and connected to said current supplying means and operative to actuate the same to apply a pulse of current to said heating element.

7. A device for sealing fusible material including in combination, a conducting element for producing heat when energized, flexible supporting means for said element, means for stretching said conducting element along said supporting means, means for positioning said supporting means in a plurality of positions, and means for supplying current to said conducting element including timer means, a first switch connected to said timer means and operative to actuate said timer means to thereby apply current to said element, and a second switch connected to said timer means for controlling said timer means to select one of a plurality of timed intervals during which current is applied to said element.

8. A device for sealing fusible material including in combination, a frame having a handle for positioning the same, an elongated flexible member supported adjacent its ends on said frame and bowed outwardly from said frame, an insulating layer on the outward side of said member, an elongated electrical heating element extending along said insulating layer, means for holding said heating elements stretched along said insulating layer, means for supplying current to said conducting element including timer means, a first switch positioned on said handle and connected to said timer means and operative to actuate said timer means to apply current to said element, said timer means including first and second variable resistors, and a second switch on said frame connected to said timer means for selectively rendering one of said resistors operative to control the timed interval during which current is applied to said element.

9. A device for sealing fusible material including in combination, a frame having a handle for positioning the same, an elongated flexible member having a center portion and angular end portions, said end portions being supported on said frame with said center portion bowed outwardly from said frame, an insulating layer on the outward side of said center portion, an elongated flat electrical heating element supported at said end portions of said flexible member and extending along said insulating layer, said heating element having a plastic coating thereon, means for supplying current to said conducting element including timer means, a first switch positioned on said handle and connected to said timer means and operative to actuate said timer means to thereby apply current to said element, and a second switch on said frame connected to said timer means for controlling said timer means to select one of a plurality of timed intervals during which current is applied to said element.

References Cited in the file of this patent

UNITED STATES PATENTS

| | | |
|---|---|---|
| 2,535,171 | Sundstrom | Dec. 26, 1950 |
| 2,796,913 | Fener | June 25, 1957 |
| 2,963,838 | Harrison | Dec. 13, 1960 |